Jan. 13, 1959 J. BRESLAW 2,867,826
FOOD SPREAD UTENSIL
Filed May 16, 1955

INVENTOR.
Joseph Breslaw

United States Patent Office 2,867,826
Patented Jan. 13, 1959

2,867,826

FOOD SPREAD UTENSIL

Joseph Breslaw, Denver, Colo.

Application May 16, 1955, Serial No. 508,455

8 Claims. (Cl. 15—105)

The present invention relates to a utensil particularly adapted to butter an ear of corn. The utensil is of novel construction, and is arranged to butter an ear of corn in a simple, efficient and sanitary manner.

Inasmuch as it is considered desirable by many people to enhance the taste of corn on the cob by spreading butter or butter-like substance upon it, a problem arises as to how this can be efficiently accomplished. Not only is butter difficult to apply because of its lack of firmness, but also it quickly melts when warmed by the corn so that it can not be gripped properly to complete the spreading action.

In the past it has generally been customary to slice a pat from a cube of butter with a table knife, or as in a restaurant to place a previously cut piece on a knife blade, and then attempt to butter the corn. Usually the bond between the knife blade and the butter will be quickly destroyed because of the friction between the butter and the corn, and also because the warmth of the heated corn melts the butter. The result is that the pat of butter slips off the corn before the application is completed. To reapply the butter is of course irritating, is likely to be unsanitary, and may also soil the hands.

To avoid these undesirable effects I have provided a utensil that will simply, efficiently, and sanitarily apply butter to an ear of corn.

My utensil can be fabricated in several forms, as will be seen from the accompanying drawings. In general however the utensil includes a frame having a cutting edge at one side so that a pat of butter may be sliced into the utensil. Or if a previously cut pat is used, an access means is provided whereby the butter can be pressed off its backing into the utensil. Rotative means are carried within the frame in such a position that they must contact the butter. They are of such configuration that when they are rotated, their surfaces penetrate into the butter. Rotation is accomplished simply by contact with the ear of corn. As they turn they move small portions of the butter onto the corn. As heat from the corn softens the butter, and as the rotating means are warmed, the butter drops through them and is spread onto the corn.

As will be seen from the drawings, the rotative means may take various forms. One form is that of a cylinder with a spiral rib formed on its surface. Another form is that created by twisting a flat strip of material from end to end. Still another form is that of a cylinder having raised cleats extending from its surface. Other shapes may be feasible also, and they may be used in alternate arrangements as desired.

In one species I disclose herein, the rotative means may be carried so as to be longitudinal with a handle attached to the frame. With such a design the buttering action is accomplished by a sweeping motion from one end of the ear of corn to the other. In another species, the rotative means are carried so as to be transverse to the handle. The buttering action is therefore a transverse one around the periphery of the ear.

In all the species disclosed, the arrangement is such that the utensil may be easily washed after use. This is so because of the space provided between the rotative means and the back wall of the carrying frame, and also because the back wall access means opens to allow the rotative means to be cleaned. To further assist cleansing, I have also disclosed one species wherein the rotative means are mounted in a yoke that is bodily removable from the carrying frame. In that species the parts can be disassembled, washed and then reassembled.

Accordingly it is a primary object of the invention to provide a utensil which may be used to butter an ear of corn in a simple, efficient, and sanitary fashion.

It is another object of the invention to provide a utensil that will butter an ear of corn without waste and which will not soil the hands of the user.

It is another object of the invention to provide a utensil capable of slicing and retaining a pat of butter adjacent operating means which will propel the butter into engagement with an ear of corn.

It is another object of the invention to provide a utensil into which a pat of butter may be inserted, and which has means to propel the butter into engagement with an ear of corn.

It is a further object of the invention to provide a utensil having a space in which butter may be carried, rotative means to engage the butter and to spread it onto an ear of corn with heat from the ear of corn assisting by warming the butter.

It is a still further object of the invention to provide a utensil which is capable of storing butter and propelling it onto an ear of corn, the parts being separable so that they may be easily washed prior to subsequent use.

It is a still further object of the invention to provide a utensil for buttering corn that is inexpensive to manufacture, as well as simple and efficient to use.

Other objects and advantages of the invention will become apparent from the following description when taken in connection with the accompanying drawings.

In the drawings.

Inasmuch as the various parts in the different embodiments are similar, like parts have been given the same numbers, but with subscripts used.

Figure 1:
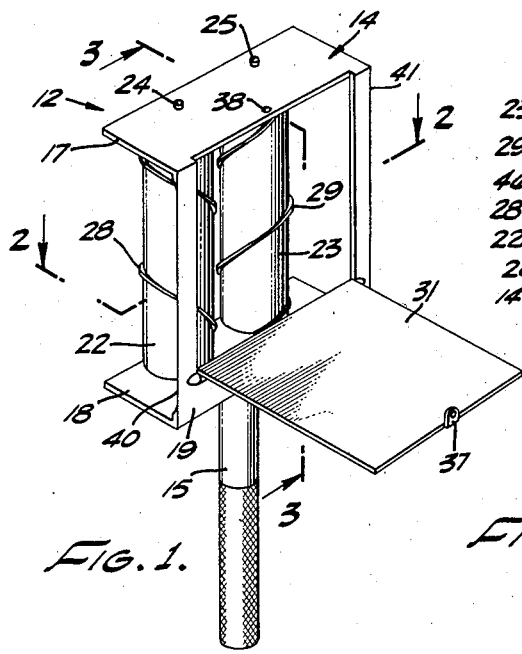
Figure 1 is a perspective view of one form of my invention. In this form, the rotative members are carried in longitudinal alignment with the handle.

In Figure 1, the utensil 12 comprises a support frame 14 and an attached handle 15. The support frame 14 includes the end walls 17 and 18, which are contiguous with and transverse to the back wall 19. Rotative members 22 and 23 are spaced from the back wall 19, and are journalled between end walls 17 and 18 by means such as pivot pins 24, 25, 26, 27.

Each rotative member is formed as a cylinder having a raised spiral rib projecting from its longitudinal surface. The spiral ribs 28 and 29, on rotative members 22 and 23 respectively, are counteracting for a purpose which will be described below.

The back wall 19 is cut away to provide an access opening. Covering this opening is a flap 31. Flap 31 is hinged to wall 19, as at 33 and 34 (see Figures 2 and 3). A detent tongue 37 cooperates with dimple 38 to hold flap 31 in closed position. Back wall 19 has side cutting edges 40 and 41 so that the utensil can be used to slice a pat of butter 43 into position between the rotative members 22, 23 and the back wall 19.

Figure 2:
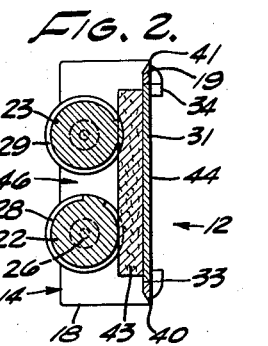
Figure 2 is a transverse sectional view of the embodiment of Figure 1, taken along the line 2—2 of Figure 1.
Figure 3:
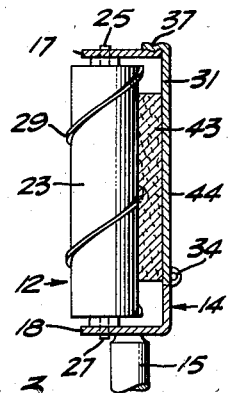
Figure 3 is a longitudinal sectional view of the embodiment of Figure 1, taken along the line 3—3 of Figure 1.

It will be seen that the utensil can be prepared for use in one of two ways. With the flap 31 in the closed position of Figure 3, the utensil can be used to slice into a cube of butter by forcing either of the two cutting edges 40 or 41 into the butter. The utensil is held so that the outward face 44 of the flap 31 cuts into the butter; this forces a pat of butter 43 into the space between the flap 31 and the rotative members 22, 23, as seen in Figures 2 and 3.

If there is no need to slice into the butter, as for example if using a previously cut pat such as is commonly served in restaurants, it is only necessary to open the access flap 31 to the position shown in Figure 1. The butter 43 can then be pressed off its backing onto the rotative members 22, 23, and the flap closed. The utensil is then ready for use.

The utensil is juxtaposed with an ear of corn. The members 22, 23 are rolled against the corn, and the utensil is moved longitudinally from one end of the ear to the other. As the members 22, 23 rotate, the spiral ribs 28 and 29 penetrate into the butter. Portions of the butter are gouged out and rotated onto the corn. The rotative members are warmed by the corn, just as is the butter still remaining in the utensil. The butter therefore commences to lose its solidity and to shift its position. Because of the counteracting spiral ribs the outwardly impelling action of the rotative members tends to cancel out, whereas the inward impelling action tends to force the butter down through the empty area 46 between the members. As a result of the eroding, propelling, and warming the butter is soon spread onto the ear of corn.

It should be understood that the events may not always occur exactly as described above, nor may they occur in any given sequence. The specific buttering action will vary according to the particular dimensions of the utensil, the size of the pat of butter, the degree and angle of pressure used, and the longitudinal movement in one direction or another with respect to the ear of corn.

Figure 4:
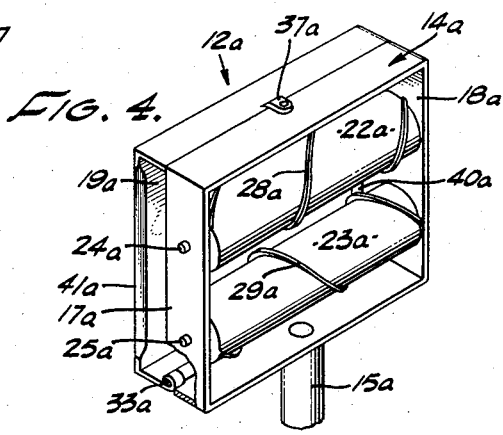
Figure 4 is a perspective view of another form of my invention, illustrating the rotative members carried in transverse relation with the handle.

The embodiment of Figure 4 has a somewhat different construction from that of Figures 1–3. In this embodiment the rotative members 22a and 23a are mounted between the side walls 17a and 18a of frame 14a, and are carried transverse to the handle 15a. Spiral ribs 28a and 29a are formed on the members 22a and 23a respectively. The entire back wall 19a is movable with respect to the side walls since it is journalled at 33a, and 34a (not shown). Cutting edges 40a and 41a are provided on the side of the back wall 19a.

The utensil of Figure 4 is used in the same general fashion as is the embodiment of Figures 1–3, except that the buttering action is transverse to an ear of corn rather than longitudinal. Also since the entire back wall 19a is movable, the utensil may be cleaned somewhat more easily after use.

Figure 6:
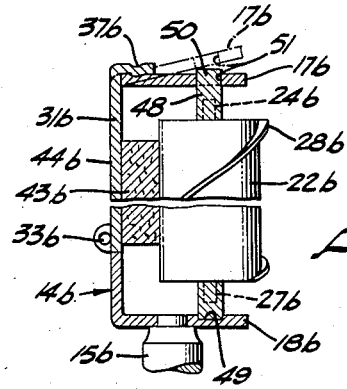
Figure 6 is a partial elevational sectional view of Figure 5, taken along the line 6—6.
Figure 5:
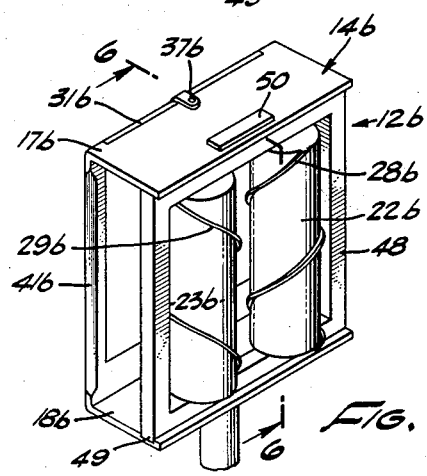
Figure 5 is a perspective view of another form of my invention, illustrating the rotative members as carried in a removable yoke.

The species of Figures 5 and 6 is constructed so that the rotative members 22b and 23b are longitudinal with the handle of the utensil. However they are mounted in a separate yoke 48, which in turn is carried in frame 14b between groove 49 of wall 18b and the underside of wall 17b. The yoke may be inserted into position, or removed, simply by flexing the wall 17b so that extension 50 is within hole 51, or out of it. This action is illustrated in Figure 6. This construction allows the rotative members and yoke to be removed as a unit for easy cleansing after use. A back flap 31b is also included in this embodiment so that a previously cut pat of butter 43b can be inserted into the utensil if desired.

Figure 7:
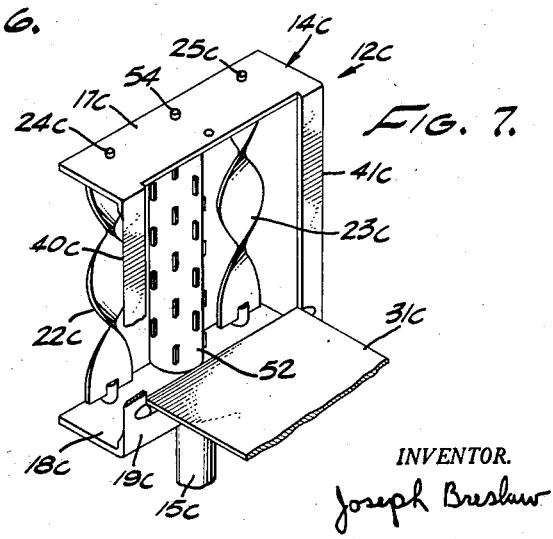
Figure 7 is a perspective view of another form of my invention, illustrating the use of rotative members which are a variation from those illustrated in the other species.

The embodiment of Figure 7 is similar to that of Figures 1–3 except that different rotative members are provided. It will be seen also that three rotative members are used instead of two. The two end members 22c and 23c are formed by twisting a flat metal strip, or otherwise fabricating, the spiral shapes illustrated. The twist is opposite in the two members so that they are counteracting. The twisted strip configuration is desirable because of the extreme simplicity of manufacture. In the embodiment of Figure 7, a central rotative member 52 mounted within frame 14c as by pivot pins 54, is included to assist in the gouging and butter spreading action. Member 52 has cleats studded over its surface to help break up the butter, and also to help spread it after it has been deposited on the corn.

It should be understood that the word "butter," both as a noun and a verb, is used for convenience in the description and claims since it is obvious that other substances such as margarine could be spread by this utensil.

It is also apparent that numerous variations in the invention are possible, as being within the capabilities of one skilled in the art. For example the number of rotative members used in any particular embodiment may be increased or decreased. The twisted rotative members and/or the cleated member of the species of Figure 7 could be used in the species of Figures 4 and 5, in place of the cylinders with the spiral ribs. Other suitable rotative members could be utilized and still be within the inventive concept. The species of Figure 1 could be constructed with the movable back wall of the species of Figure 4, instead of with the access flap shown. The species of Figure 4 could be arranged so that the rotative members are carried in a removable yoke as in Figure 5. The species of Figure 7 could be constructed so that only the two outer rotative members are used, and the central member is eliminated. Likewise, metal, plastic, rubber, wood, glass, etc. could be used to fabricate the parts. Also dimensions for the parts may be varied to provide optimum results. Other variations and changes could be made which would be within the scope of the following claims.

What I claim is:

1. In a utensil for spreading butter upon an object held in close proximity and external to the utensil, carrying means, at least one rotative member journalled to said carrying means, said carrying means having a wall laterally spaced from said rotative member, cutting means at one edge of the wall so that a pat of butter may be sliced into the space between the wall and the rotative member, said rotative member being of such configuration as to cut into the pat of butter and to rotate portions of the butter onto the said object.

2. A utensil as in claim 1 wherein the rotative member is generally cylindrical with a raised spiral rib formed upon its surface.

3. A utensil as in claim 1 wherein at least one rotative member is generally cylindrical with cleats extending from its surface.

4. A utensil as in claim 1 wherein at least one rotative member is formed of a flat strip twisted from end to end.

5. A utensil as in claim 1 and including a yoke removably mounted in the carrying means, the rotative member being mounted in the yoke.

6. A utensil as in claim 1 wherein an opening is cut out of the said wall, and a flap is journalled to the wall to cover or uncover said opening.

7. A utensil as in claim 1 wherein hinge means join the said wall to the carrying means, whereby the said wall may be moved to increase the said space between the wall and the rotative member.

8. In a utensil for applying a food spread, a frame, at least one rotative member carried by said frame, a back wall attached to said frame, a space between the back wall and the rotative member within which a pat of the spread may be retained, said rotative member having a spiral configuration so as to cut into the said pat of spread and to rotate portions of the spread onto a food item juxtaposed with the utensil.

References Cited in the file of this patent

UNITED STATES PATENTS

| | | |
|---|---|---|
| 279,551 | Evans | June 19, 1883 |
| 396,860 | Coston | Jan. 29, 1889 |
| 619,489 | Keefe | Feb. 14, 1899 |
| 640,429 | Stoddart | Jan. 2, 1900 |
| 711,264 | Rothschild | Oct. 14, 1902 |
| 732,916 | Bartlett | July 7, 1903 |
| 1,024,413 | Miks | Apr. 23, 1912 |
| 1,048,919 | Van Wye | Dec. 31, 1912 |
| 1,251,160 | Woody | Dec. 25, 1917 |
| 1,426,085 | Kohn | Aug. 15, 1922 |
| 1,494,018 | Randolph | May 13, 1924 |
| 1,674,229 | Scruggs | June 19, 1928 |
| 1,893,889 | Guerini | Jan. 10, 1933 |
| 2,159,670 | Neitzke | May 23, 1939 |
| 2,222,909 | Cascio | Nov. 26, 1940 |
| 2,271,175 | Mantelet | Jan. 27, 1942 |
| 2,474,733 | Gallagher | June 28, 1949 |